Dec. 1, 1931.  V. K. ZWORYKIN  1,834,197
SOUND RECORDING AND REPRODUCING SYSTEM
Filed July 14, 1928
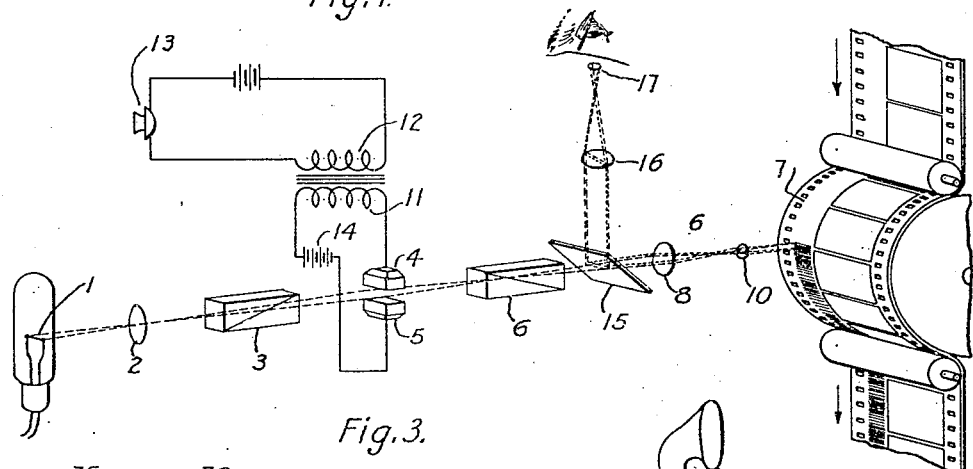
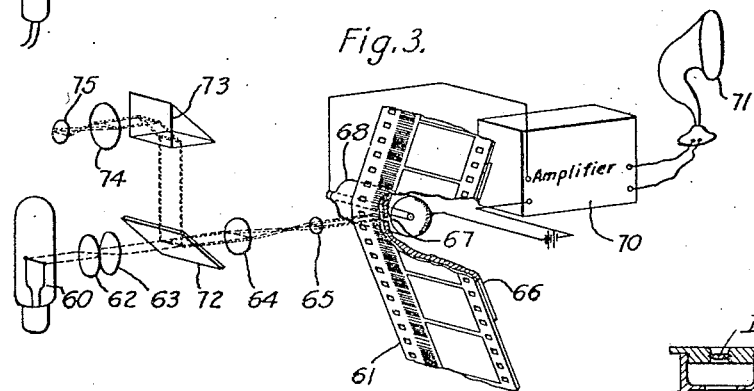
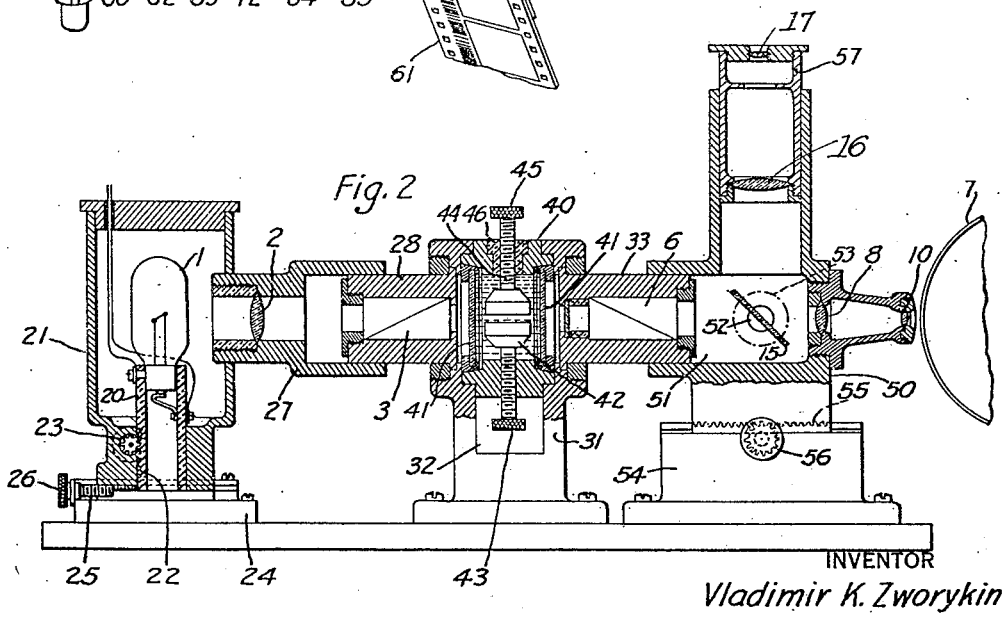
INVENTOR
Vladimir K. Zworykin
BY
ATTORNEY Patented Dec. 1, 1931

1,834,197

UNITED STATES PATENT OFFICE

VLADIMIR K. ZWORYKIN, OF SWISSVALE, PENNSYLVANIA, ASSIGNOR TO WESTINGHOUSE ELECTRIC & MANUFACTURING COMPANY, A CORPORATION OF PENNSYLVANIA

SOUND RECORDING AND REPRODUCING SYSTEM

Application filed July 14, 1928. Serial No. 292,889.

My invention relates to sound recording-and-reproducing systems, and more especially to systems of the type wherein the sound is photographically recorded upon a moving, sensitized film.

Photographic sound-records on talking motion-picture films may be divided into two main classes; namely, those in which the sound is represented by an area of constant density and variable width and those in which the sound is represented by an area of constant width which varies in density longitudinally of the film.

It has previously been proposed, in making records of the last-mentioned type, to utilize an extremely narrow slot, closely adjacent to the film, in order to limit the amount of light impinging on the film. Such slots, however, by reason of the dust which unavoidably collects in them, and by reason of diffraction phenomena, have been unsatisfactory.

It has also been proposed to fill the slot with glass, quartz or other material, in order to prevent the accumulation of dust, but difficulty has been experienced in grinding the plate of filling material to the requisite thinness, and in properly mounting it in the slot.

It is accordingly, an object of my invention to provide, in a photographic sound-recording system, an arrangement of parts whereby the light may be optically concentrated, as a fine line, on a photographic film without the necessity of employing limiting slots, or the like.

Another object of my invention is to provide, in a system of the type described, a viewing device whereby the line of light on the film may be observed, and the adjustment of the optical system changed, if necessary, at any time during the making or the reproducing of a photographic sound record, without interruption to the recording or reproducing process.

Another object of my invention is to provide, in a system of the type described, an improved device for controlling a light beam in accordance with sound.

Another object of my invention is to provide, in a system of the type described, means for facilitating the accurate adjustment of the light-controlling device.

In carrying my invention into practice, I provide a linear source of light, such as an illuminated slot or an incandescent filament, and cause the light therefrom to be projected, by an optical system, through a polarizing device and an analyzing device, toward a moving film. A secondary optical system is provided which concentrates the beam of light on the film in the form of an extremely thin line.

A Kerr cell, constituted by a plurality of electrodes immersed in a liquid, such as nitrobenzole, is so disposed between the polarizing and the analyzing devices that the beam of light is brought to a focus between the said electrodes.

I further provide means for impressing potentials, representative of sound frequencies, across the cell-electrodes, whereby the plane of polarization of the light beam is caused to rotate in accordance therewith. The analyzing device, therefore, offers more or less obstruction to the modulated beam of light, and the line of light, as concentrated by the secondary optical system onto the film, accordingly varies in density to produce a photographic record of the original sound.

In order that the appearance of the line of light on the photographic film may be observed at any time during the recording process, I interpose a thin, transparent plate of glass or the like, inclined at an angle of 45° to the common axis of the optical systems, between the analyzing device and the secondary lens-system, on which plate is reflected an image of the line, enlarged by the said lens-system.

The enlarged image may be viewed directly through an opening in the side of the barrel which carries the plate, or it may be projected by an appropriate lens-system upon a translucent screen. I prefer, however, to provide an "ocular", or eye-piece instead of a screen, in order that the image may be further enlarged before it reaches the eye.

In the reproducing process, the polarizing device, the analyzing device, and the Kerr cell are omitted, the light from the source being brought to a focus directly upon the film, through which is passes to fall upon a photo-electric cell disposed rearwardly thereof.

The novel features that I consider characteristic of my invention are set forth with particularity in the appended claims. The invention itself however, both as to its organization and its method of operation, together with further objects and advantages thereof, will best be understood by reference to the following description of certain specific embodiments, taken with the accompanying drawings, in which:

Figure 1 is a view, partly diagrammatic and partly in perspective, of a photographic sound-recording system comprising a preferred embodiment of my invention, Fig. 2 is an elevational view, partly in section, of a photographic sound-recording device, and Fig. 3 is a diagrammatic view of a sound reproducing system comprising an embodiment of my invention.

The apparatus illustrated in Fig. 1 comprises a linear light source 1 and a lens 2 for projecting a beam of light through a polarizing device 3, or Nicol prism, to form an image intermediate the electrodes 4 and 5 of a Kerr cell. After emerging from the Kerr cell, the beam traverses a second Nicol prism 6 and is brought to a focus as a fine line of light on a moving photographic film 7 by a secondary optical system comprising a plurality of lenses 8 and 10. The line is preferably not over one-eighth of an inch long and should not be over four ten-thousandths of an inch thick, for best results.

The electrodes of the Kerr cell are connected to the terminals of the secondary winding 11 of an audio-frequency transformer, the primary winding 12 of which is arranged to be supplied with fluctuating current under the control of a microphone 13. In order to improve the operating characteristics of the Kerr cell, I find it preferable to maintain a definite polarizing potential across the electrodes thereof, a small battery 14 being supplied for this purpose. In actual practice the Kerr cell electrodes would preferably be connected to the output terminals of a multistage amplifier.

A thin element 15 of transparent material, such as glass or the like, is interposed in the beam of light between the analyzing device 6 and the secondary lens system. The element is inclined at an angle to the light beam which traverses it and serves to reflect a magnified image of the line of light, as it appears on the film, through a viewing device which may comprise a plurality of lenses 16 and 17. Inasmuch as the image of the line of light is reflected from both surfaces of the element 15, the observer will see two parallel lines which are separated by a distance proportional to the thickness of the element. The image is magnified several times, upon reflection through the lens system, and it may be again magnified in the viewing device, if desirable.

The linear light source 1 is supported by a socket device 20 which is slidably mounted in an opening in the base of a housing 21. A rack 22, carried by the socket device, and a pinion 23, pivotally mounted in the housing, cooperate to provide means whereby the light source may be vertically adjusted. The housing 21 is slidably mounted on a base member 24; a screw 25, having a knurled head 26, being provided for moving the housing axially of the optical system. The lens 2 is carried by an axially movable barrel 27, one end of which projects into the housing 21 and the other end of which circles an extension 28 of a mounting device for the Kerr cell, which extension may also house the polarizing device 3.

The Kerr-cell mounting preferably comprises a standard 31 which has a transverse opening 32 therethrough and is provided with an additional extension 33 in which is mounted the analyzing device 6.

The Kerr-cell, which is preferably of the type disclosed in the copending application of Walter Gallahan, Serial No. 255,163, filed February 7, 1928, and assigned to the Westinghouse Electric and Manufacturing Company (Case No. 13,735), comprises a housing 40 which may be slidably inserted into the opening 32 in the standard 31. The housing is provided with a central opening which, when the Kerr-cell is inserted in the standard, lies axially of the entire optical system. Each end of the opening is closed by a glass window 41, and the space thus formed is filled with nitrobenzol or a liquid having similar optical properties.

An electrode 42 is adjustably carried by a supporting device 43 which extends through the bottom wall of the housing, and another electrode 44 is carried by a similar adjusting device 45 extending downward through an insulating insert 46 embedded in the upper wall of the housing. The physical details of the Kerr-cell per se may be different in different cases, although I have found it usually desirable to provide means for both adjusting the gap between the electrodes and for raising or lowering both electrodes simultaneously to so position the gap that it lies exactly in the axis of the optical system.

I have also found it highly desirable that the inner walls of the Kerr cell, and the electrodes as well, shall be incapable of chemical reaction with the nitrobenzol. I have made use of gold plating for this purpose, with more or less success, but have determined that carbon is perhaps the best substance from which to make the electrodes. A heavy plating of nickel over brass has been found to be sufficiently resistive to the action of the nitrobenzol to enable this metal to be used for the walls of the electrode housing.

The secondary lens system, consisting of the lenses 8 and 10, is carried by a standard 50 having an axial opening 51 therethrough into which the extension 33 slidably projects.

A short shaft 52 is journalled in one wall of the opening 51 and carries the reflecting element 15. An adjusting knob 53 is affixed to the shaft 52 exteriorly of the standard, whereby the element 15 may be disposed at any desired angle with respect to the axis of the optical system.

The standard 50 is slidably supported on a base member 54 and carries a rack 55 which cooperates with an adjusting pinion 56 journalled in the said base member.

The viewing device comprises a tube 57 telescopically mounted in a tubular extension of the standard 50 which communicates with the opening 51, the lenses 16 and 17 being positioned therein and held in place by suitable means.

In the operation of a recording system arranged according to my invention, the various adjusting devices are so manipulated that a narrow line of intense light is focused on the moving film. The operator, by applying his eye to the viewing device, may observe the line of light both during the recording process and preliminary thereto. He may also, during the adjustment of the system preliminary to making a sound record, rotate the element 15 through 180° in order to directly view the Kerr-cell electrodes for the purpose of properly adjusting the gap between them.

Inasmuch as the operator may keep the line of light under constant observation while the sound is being recorded, the resulting record is necessarily much more nearly perfect than if reliance is placed upon a single preliminary adjustment of the optical system preparatory to recording, as is the case in apparatus constructed according to the teachings of the prior art.

The fact that two images of the line are visible to the operator is not disadvantageous. The image which is reflected from the surface of the element 15 that is nearest the film is the brighter of the two, and it is this image that is relied upon for adjustment purposes. The image is magnified approximately four times by the same lens which concentrates the primary beam upon the film and, as hereinbefore mentioned, it may again be magnified in the viewing device.

My invention is also of value in connection with devices for recreating the sound which has been photographically recorded. When utilized in connection with a reproducing system, the Kerr cell and the Nicol prisms are, of course, omitted, the light source being disposed in approximately the position occupied by the Kerr cell in the recording arrangement.

Referring specifically to Fig. 3, which diagrammatically illustrates a reproducing system, a beam of light from a light source 60 is projected toward a moving positive film 61 by means of a lens system comprising a plurality of lenses 62, 63, 64 and 65. The last mentioned lenses 64 and 65 constitute a reducing system which serves to concentrate the light on the filament in the form of a narrow line approximately four ten-thousandths of an inch thick and possibly three-sixteenths of an inch long.

The film passes over a shield 66 through which extends a narrow slot 67. A photo-electric cell 68, preferably non-microphonic in character, is disposed immediately behind the shield and closely adjacent to the slot. The electrodes of the photo-electric cell are connected to the input terminals of an audio-frequency amplifier 70, the output from which may be conveyed to a sound-producing instrument 71 of any preferred type.

A transparent reflecting member 72, preferably of extremely thin glass or the like, is interposed between the lenses 63 and 64 and is inclined at an angle to the axis of the optical system. This member serves to reflect an image of the line of light, as it appears on the film, upwardly toward a second reflecting device 73, which latter may be either a mirror or a prism. The reflection from the second device 73 may be observed through a viewing assembly comprising a plurality of lenses 74 and 75, arranged substantially the same as in the viewing device hereinbefore described.

By providing the second reflecting member, however, the viewing assembly may be turned, around a vertical axis, to any position most convenient for observation purposes.

I have, accordingly, by my invention, avoided all necessity for using a narrow slot closely adjacent to the film for limiting the light in sound-recording-and-reproducing systems, and have provided, instead, optical means whereby a line of light of any desired tenuity may be obtained.

In addition, my viewing device, by permitting observation of the line of light on the film at any time during the recording or reproducing processes without interruption thereto, enables the operator to maintain the line at the proper thinness and to keep it at a constant angle transverse of the film.

My improved Kerr-cell, having carbon electrodes and a resistive interior plating, is also of great commercial importance, inasmuch as the action of the cell is largely dependent upon the purity of the nitrobenzol.

Although I have illustrated and described certain specific embodiments of my invention, it is not to be restricted thereto. Many modifications of my invention will be apparent to those skilled in the art to which it pertains and I do not desire it to be limited except insofar as is necessitated by the prior art or by the spirit of the appended claims.

I claim as my invention:

1. In apparatus of the character described, a movable film, means for projecting a beam of light toward the film, a lens for focusing the beam to form a narrow line of light on the film, a viewing device, and a member arranged to reflect toward said viewing device an image of said line of light magnified by said lens.

2. In apparatus of the character described, a movable film, means for projecting a beam of light toward the film, a lens for focusing the beam to form a narrow line of light on the film, a viewing device, and a member interposed in said beam at an angle to the axis thereof and arranged to reflect toward said viewing device an image of said line of light magnified by said lens.

3. In apparatus of the character described, a movable film, a linear light source, means for projecting a beam of light from said source toward said film, a lens for focusing the beam to form a narrow line of light on said film transverse thereof, a viewing device, and a member interposed in the path of said beam between said source and said lens, said member being arranged to reflect toward said viewing device an image of said line of light as it appears on said film, whereby the said line of light may be observed and throughout the process of sound recording or reproducing without interfering with the movement of said film.

4. In apparatus of the character described, a movable film, a light source, means for projecting a beam of light from said source toward the film, a lens for focusing the beam to form a narrow transverse line of light on film, a viewing device comprising a lens, and a member arranged to reflect through said viewing device an image of said line of light magnified by said lenses.

5. In apparatus of the character described, a movable film, a light source, means for projecting a beam of light from said source toward the film, a lens for focusing the beam to form a narrow transverse line of light on the film, a viewing device comprising a lens and a reflecting element, and a transparent member arranged in the path of said beam to reflect through said viewing device an image of said line of light magnified by said lenses.

6. In apparatus of the character described, a movable film, a light source, means for projecting a beam of light from said source toward the film, a lens for focusing the beam to form a narrow transverse line of light on the film, a viewing device, a member arranged to reflect toward said viewing device an image of said line magnified by said lens, and means for adjusting said member to directly reflect the beam of light to said viewing device before it passes through said lens.

7. In apparatus of the character described, a movable film, means for projecting a beam of light toward the film, a lens for focusing the beam to form a narrow line of light on the film, a viewing screen, and a member arranged to reflect on said screen an image of said line of light magnified by said lens.

In testimony whereof, I have hereunto subscribed my name this 9th day of July, 1928.

VLADIMIR K. ZWORYKIN.